United States Patent
Lei et al.

(10) Patent No.: US 10,542,493 B2
(45) Date of Patent: Jan. 21, 2020

(54) VEHICLE COMMUNICATIONS MANAGEMENT

(71) Applicant: Ford Global Technologies, LLC, Dearborn, MI (US)

(72) Inventors: Oliver Lei, Windsor (CA); Tuan Anh Be, Livonia, MI (US); Allen R. Murray, Lake Orion, MI (US); Noorulla Mohammed, Farmington Hills, MI (US); David Joseph Orris, Southgate, MI (US); Vladyslav Slyusar, Northville, MI (US); Alex Michael Heilala, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/639,720

(22) Filed: Jun. 30, 2017

(65) Prior Publication Data
US 2019/0007900 A1  Jan. 3, 2019

(51) Int. Cl.
*H04W 52/02* (2009.01)
*H04L 12/40* (2006.01)
*B60R 16/023* (2006.01)

(52) U.S. Cl.
CPC ......... *H04W 52/0229* (2013.01); *H04L 12/40* (2013.01); *B60R 16/023* (2013.01); *H04L 2012/40273* (2013.01)

(58) Field of Classification Search
CPC ...... H04B 1/06; H04B 1/1615; H04B 1/3822; H04L 12/40; H04L 2012/40273; H04W 52/0225; H04W 52/0229; H04W 52/0283; H04W 76/10
See application file for complete search history.

(56) References Cited

U.S. PATENT DOCUMENTS

| | | | | |
|---|---|---|---|---|
| 5,661,651 A | * | 8/1997 | Geschke | B60C 23/0408 701/88 |
| 6,229,452 B1 | * | 5/2001 | Kull | B60T 13/665 246/1 C |

(Continued)

FOREIGN PATENT DOCUMENTS

| | | | | |
|---|---|---|---|---|
| AU | 9509301 A | * | 4/2002 | G07C 5/008 |
| CN | 106231641 A | * | 12/2016 | |

(Continued)

OTHER PUBLICATIONS

Choi et al., A 5.8-GHz DSRC Transceiver With a 10μA Interference-Aware Wake-Up Receiver for the Chinese ETCS, Dec. 2014, IEEE, IEEE Transactions on Microwave Theory and Techniques, vol. 62, No. 12 (Year: 2014).*

*Primary Examiner* — Eric Nowlin
(74) *Attorney, Agent, or Firm* — Michael J. Spenner; Brooks Kushman P.C.

(57) ABSTRACT

Systems and methods for managing communications equipment of a vehicle. The vehicle includes a first modem and a second modem coupled to the first modem. Responsive to the second modem wireless receiving first data for the first modem when the vehicle is in an inactive state, the first modem is in an off state, and the second modem is in a low power state, the vehicle is configured to wake the first modem from the off state, and process the first data via the first modem.

17 Claims, 4 Drawing Sheets

(56) References Cited

U.S. PATENT DOCUMENTS

| | | | |
|---|---|---|---|
| 6,469,638 B1* | 10/2002 | Johnson | G07C 5/008 340/438 |
| 7,286,859 B2* | 10/2007 | Cunningham | H04W 52/0225 455/574 |
| 8,059,628 B2* | 11/2011 | Bradley | A61N 1/37276 370/343 |
| 8,676,192 B2* | 3/2014 | Jalali | H01Q 1/2291 455/432.1 |
| 8,682,317 B2* | 3/2014 | Pinder | H03J 1/0091 455/434 |
| 8,964,737 B2* | 2/2015 | Lee | H04B 7/0805 370/236 |
| 9,306,665 B1* | 4/2016 | Amir | H04B 10/11 |
| 9,380,493 B2 | 6/2016 | Scheim et al. | |
| 9,426,728 B2* | 8/2016 | Draznin | H04L 12/5692 |
| 9,465,388 B1* | 10/2016 | Fairfield | G05D 1/0044 |
| 9,479,999 B2 | 10/2016 | Zhang et al. | |
| 9,571,053 B1* | 2/2017 | Cousinard | A42B 3/225 |
| 9,656,621 B2* | 5/2017 | Curtis | G08B 21/182 |
| 9,723,559 B2* | 8/2017 | Kates | G08B 1/08 |
| 9,883,452 B2* | 1/2018 | Sela | H04B 1/3838 |
| 9,961,706 B2* | 5/2018 | Ho | H04W 76/14 |
| 10,028,196 B2* | 7/2018 | Karimi-Cherkandi | H04W 48/16 |
| 10,080,122 B2* | 9/2018 | Visweswara | H04B 13/005 |
| 10,200,925 B2* | 2/2019 | Hinman | H04W 36/14 |
| 2007/0063824 A1* | 3/2007 | Gaddy | G08G 1/096783 340/426.21 |
| 2007/0139158 A1* | 6/2007 | Manson | B60R 25/24 340/5.64 |
| 2009/0252042 A1* | 10/2009 | Bradley | A61N 1/37276 370/241 |
| 2012/0202430 A1* | 8/2012 | Jalali | H01Q 1/2291 455/63.1 |
| 2013/0121145 A1* | 5/2013 | Draznin | H04L 12/5692 370/230 |
| 2013/0148641 A1* | 6/2013 | Sivaprakasam | H04W 36/30 370/338 |
| 2013/0176878 A1* | 7/2013 | Lee | H04B 7/0805 370/252 |
| 2015/0004974 A1* | 1/2015 | Karimi-Cherkandi | H04W 48/16 455/435.2 |
| 2015/0070192 A1* | 3/2015 | Kates | G08B 1/08 340/870.39 |
| 2015/0111594 A1* | 4/2015 | Cui | H04W 28/08 455/453 |
| 2016/0050516 A1* | 2/2016 | Visweswara | H04B 13/005 455/41.2 |
| 2016/0191704 A1 | 6/2016 | Macinnes et al. | |
| 2016/0247382 A1* | 8/2016 | Kates | G08B 1/08 |
| 2016/0248905 A1* | 8/2016 | Miller | H04W 4/021 |
| 2016/0253903 A1* | 9/2016 | Wilk | G08G 1/0965 340/902 |
| 2016/0261291 A1* | 9/2016 | Colella | H04B 1/0064 |
| 2017/0006517 A1* | 1/2017 | Karimi-Cherkandi | H04W 48/16 |
| 2017/0088072 A1* | 3/2017 | Curtis | G08B 21/182 |
| 2017/0215121 A1* | 7/2017 | Condeixa | H04W 36/18 |
| 2017/0264657 A1* | 9/2017 | Lee | H04B 17/318 |
| 2017/0332327 A1* | 11/2017 | Fang | H04L 5/0007 |
| 2018/0020409 A1* | 1/2018 | Aboul-Magd | H04L 27/2602 |
| 2018/0041959 A1* | 2/2018 | Yang | H04B 1/3805 |
| 2018/0110000 A1* | 4/2018 | Shellhammer | H04W 52/0206 |
| 2018/0270729 A1* | 9/2018 | Ramachandra | H04W 36/00 |
| 2018/0310219 A1* | 10/2018 | Karimi-Cherkandi | H04W 48/16 |
| 2018/0376419 A1* | 12/2018 | Li | H04W 52/0222 |
| 2019/0014541 A1* | 1/2019 | Li | H04L 25/0202 |
| 2019/0045444 A1* | 2/2019 | Huang | H04W 52/0229 |
| 2019/0188925 A1* | 6/2019 | Calvert | G07C 5/008 |

FOREIGN PATENT DOCUMENTS

| | | | | |
|---|---|---|---|---|
| GB | 2433633 A | * | 6/2007 | B60R 25/24 |
| WO | WO-0229567 A1 | * | 4/2002 | G07C 5/008 |
| WO | WO-2018010638 A1 | * | 1/2018 | H04L 27/2602 |
| WO | WO-2018024199 A1 | * | 2/2018 | H04B 1/3805 |
| WO | WO-2018075130 A1 | * | 4/2018 | H04W 52/0206 |

\* cited by examiner

VEHICLE COMMUNICATIONS MANAGEMENT

TECHNICAL FIELD

Aspects of the disclosure generally relate to managing communication equipment on a vehicle.

BACKGROUND

Modern vehicles typically include on-board equipment for communicating with remote systems. On-board communication equipment enhances a vehicle, such as by enabling the vehicle to process remote control commands when the vehicle engine is off. However, on-board communication equipment also draws power from a battery of the vehicle. If too much power is drawn from the battery when the vehicle engine is off, the charge of the battery may become insufficient to restart the engine.

SUMMARY

In an exemplary embodiment, a vehicle includes a first modem and a second modem coupled to the first modem. The vehicle is configured to, responsive to the second modem wirelessly receiving first data for the first modem when the vehicle is in an inactive state, the first modem is in an off state, and the second modem is in a low power state, wake the first modem from the off state, and process the first data via the first modem.

In a further exemplary embodiment, a vehicle includes a first modem and a second modem having a higher speed capability than the first modem. The vehicle is configured to, responsive to entering an inactive state, and to the first network connection level of the first modem being equal to a second network connection level of the second modem, place the first modem in a low power state, and place the second modem into an off state.

In another exemplary embodiment, a method includes receiving, at a server from a vehicle including a first modem configured for a first cellular network and a second modem configured for a second cellular network, an indication of the second modem. The method further includes recording, by the server, the indication. The method also includes receiving, at the server, data for the first modem from a user device after the indication is recorded, and transmitting, by the server, the data to the second modem based on the indication.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle's communication equipment may include multiple modems each capable of wirelessly communicating with one or more remote systems over a wide-area network. Each modem may be configured for a different remote service for the vehicle, and may connect to the network over a different network service provider. For example, one modem may be configured to process remote vehicle commands (e.g., a door unlock command) received for the vehicle, and another modem may be configured to download and upload relatively larger files for the vehicle (e.g., vehicle-captured video, 3D maps).

When a vehicle is placed in an inactive state, it is desirable to maintain the ability of the vehicle modems to receive and process data, such as a remote vehicle command or a request for a vehicle-captured image. However, as the modems operate, they draw power from the vehicle battery. If too much power is drawn from the vehicle battery while the vehicle is off, then the charge of the battery may be insufficient to start the vehicle at a later time. Moreover, continuously operating each on-board modem when the vehicle is inactive may be inefficient if one of the modems has little or no network coverage.

Accordingly, rather than running each of the on-board modems when the vehicle is in an inactive state, the vehicle may, responsive to the vehicle entering the inactive state, determine which modem has superior network coverage. The vehicle may then place the modem with superior network coverage in a low power state in which the modem remains able to communicate with remote systems, and place the other modems in an off state. Thereafter, the modem in the low power state may wirelessly receive data for the vehicle, regardless of whether the receiving modem or another modem is configured to process the type of data received. Then, if the data received is for another modem, the vehicle may wake the other modem to enable the modem to process the received data and, if needed to process the data, establish a connection with its network provider. The other modem may go back to the off state after it has finished processing the received data. In this way, the draw on the vehicle battery by the modems when the vehicle is in an inactive state is minimized. Furthermore, the communication capability of the vehicle may be improved when the vehicle is in an inactive state, as data for each on-board modem may be transmitted to the vehicle via the modem with the strongest network connection.

Figure 1:
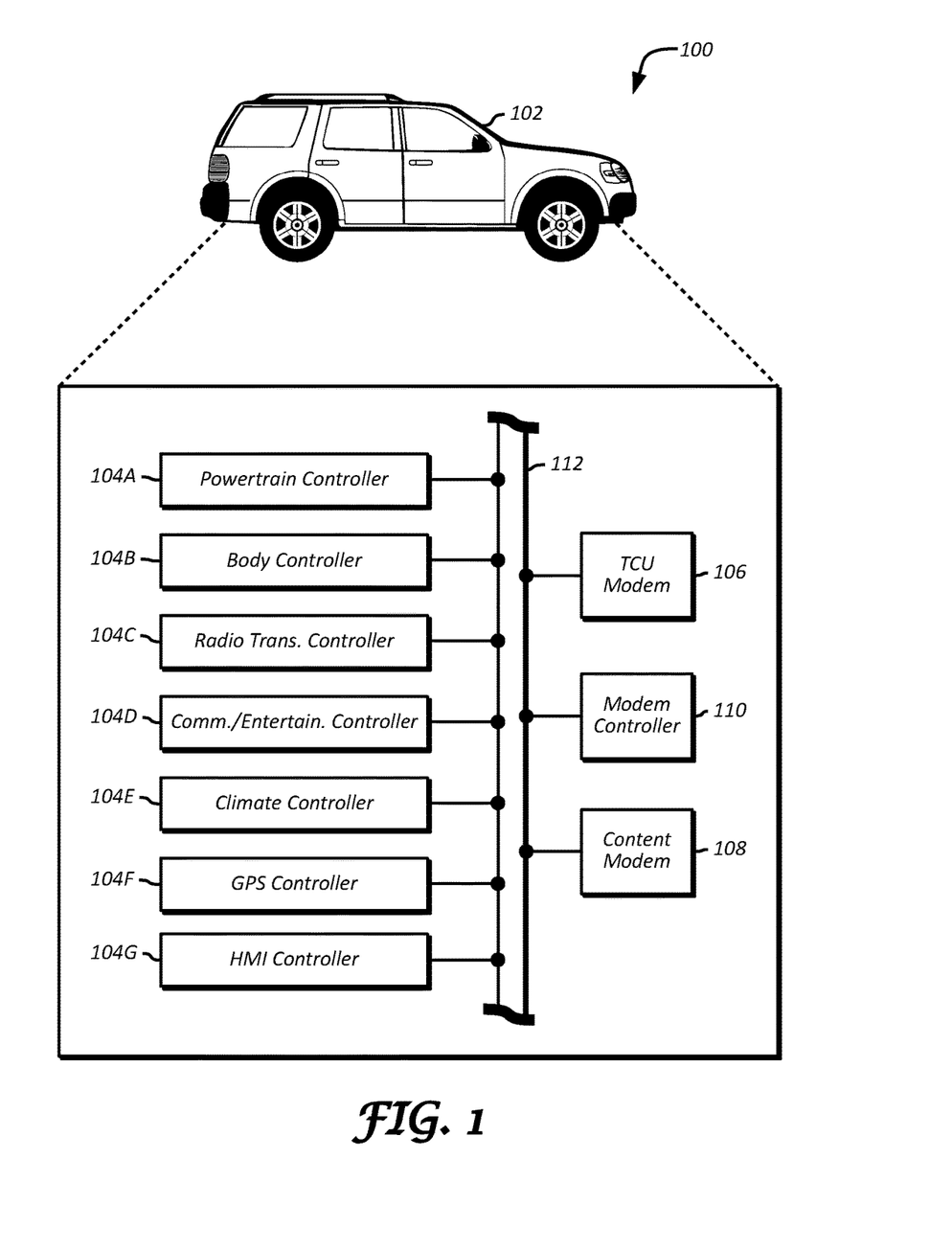
FIG. 1 is a schematic view of an exemplary vehicle computing environment.

FIG. 1 illustrates an exemplary vehicle computing environment 100 for managing communication equipment of a vehicle 102. As illustrated, the vehicle 102 may include several vehicle systems, such as a plurality of vehicle controllers 104, a telematics control unit (TCU) modem 106, a content modem 108, and a modem controller 110. Each of these systems may communicate with one another over one or more vehicle buses 112 to which the systems are connected. While an exemplary environment 100 is shown in FIG. 1, the example is not intended to be limiting. Indeed, the environment 100 may have more or fewer components, and alternative components and/or implementations may be used. For example, although the environment 100 illustrates a vehicle 102 having two modems 106, 108, embodiments described herein can be applied to a vehicle 102 with three or more modems, where each of the modems is configured to provide and process a different remote service for the vehicle 102, and/or at least one of the modems is configured for a different network service provider than at least one other of the modems.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). The vehicle 102 may also be an autonomous vehicle (AV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle controllers 104 of the vehicle 102 may be configured to perform and manage various functions of the vehicle 102 under the power of the vehicle battery and/or drivetrain. As illustrated, the vehicle controllers 104 are represented as discrete controllers 104A through 104G. However, one or more of the vehicle controllers 104 may share physical hardware, firmware, and/or software, such that the functionality from multiple vehicle controllers 104 may be integrated into a single vehicle controller 104, and/or such that the functionality of one or more vehicle controllers 104 may be distributed across a plurality of vehicle controllers 104. Similarly, one or more of the TCU modem 106, the content modem 108, and modem controller 110 may share physical hardware, firmware, and/or software with one another and with one or more of the vehicle controllers 104.

As some non-limiting examples, the vehicle controllers 104 may include the following: a powertrain controller 104A, which may be configured to provide control of engine operating components (e.g., idle control components, fuel delivery components, emissions control components, etc.) and for monitoring status of such engine operating components (e.g., status of engine codes); a body controller 104B, which may be configured to manage various power control functions such as exterior lighting, interior lighting, keyless entry, remote start, and point of access status verification (e.g., closure status of the hood, doors and/or trunk of the vehicle 102); a radio transceiver controller 104C, which may be configured to communicate with key fobs, mobile devices, or other local vehicle 102 devices; a communication and entertainment controller 104D, which may be configured to support voice command and BLUETOOTH interfaces with the driver and driver carry-on devices; a climate manager controller 104E, which may be configured to provide control of heating and cooling system components (e.g., compressor clutch, blower fan, temperature sensors, etc.); a global positioning system (GPS) controller 104F, which may be configured to provide vehicle location information; and a human-machine interface (HMI) controller 104G, which may be configured to receive user input via various buttons or other controls, as well as provide vehicle status information to a driver, such as fuel level information, engine operating temperature information, and current location of the vehicle 102.

The one or more vehicle buses 112 may include various methods of communication available between the vehicle controllers 104, as well as between the TCU modem 106, the content modem 108, the modem controller 110, and the vehicle controllers 104. As some non-limiting examples, the one or more vehicle buses 112 may include one or more of a vehicle controller area network (CAN), an Ethernet network, and a media oriented system transfer (MOST) network.

Figure 2:
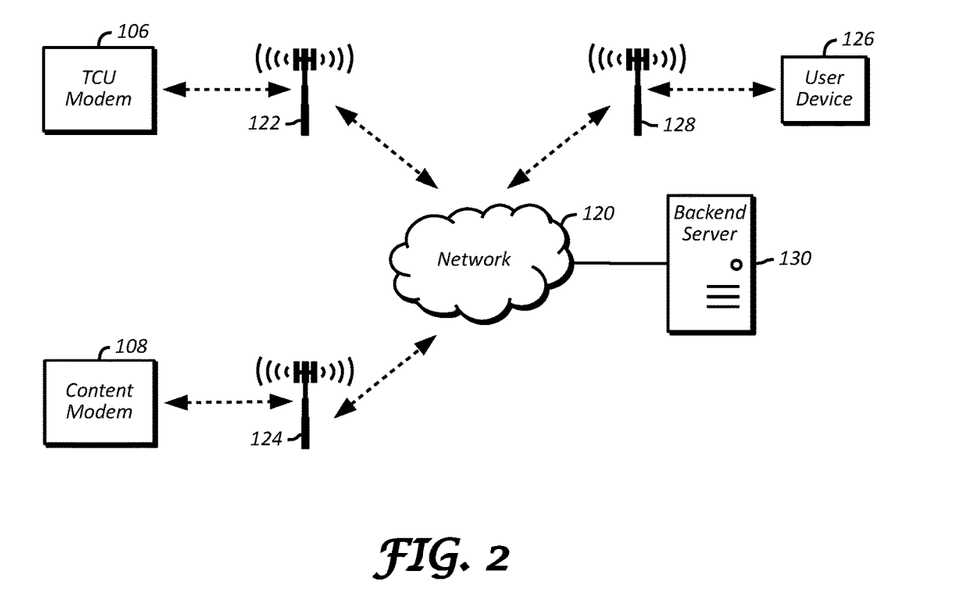
FIG. 2 is a schematic view of an exemplary connection between the vehicle of FIG. 1 and a server.

FIG. 2 illustrates an exemplary connection between the vehicle 102 and one or more remote systems. Each of the TCU modem 106 and the content modem 108 of the vehicle 102 may facilitate wireless communication between the vehicle 102 and a backend server 130, and/or between the vehicle 102 and a user device 126. Specifically, the TCU modem 106 and the content modem 108 may be configured to establish a wireless connection with an external communications device, such as cellular tower 122 or cellular tower 124, to connect to the network 120. The network 120 may be a wide-area network that includes one or more interconnected communication networks such as the Internet, a cable television distribution network, a satellite link network, a local area network, a wide area network, and a telephone network, as some non-limiting examples. The user device 126 and the backend server 130 may also be connected to network 120. For example, the user device 126 may access the network 120 via a cellular tower 128 that is similar to the cellular towers 122, 124.

The TCU modem 106 may be configured to connect to a different network provider than the content modem 108 to access the network 120. For example, the TCU modem 106 may be configured to connect to the cellular tower 122, which may be provided by one cellular network provider, and the content modem 108 may be configured to connect to the cellular tower 124, which may be provided by another cellular network provider. In this way, the TCU modem 106 and the content modem 108 may have different levels of coverage depending on the location of the vehicle 102 relative to the cellular towers 122, 124 of the different cellular network providers.

The TCU modem 106 may be configured to facilitate remote control services for the vehicle 102. Specifically, a user may submit a remote control command, such as a door unlock command, a remote start engine command, a charging command to schedule charging for an electric vehicle, and a climate control command, for the vehicle 102 via the user device 126. Non-limiting examples of the user device 126 include a mobile phone, a tablet, a desktop computer, a laptop computer, and a key fob. The user device 126 may then transmit the submitted command to the backend server 130 over the network 120. Thereafter, the backend server 130 may determine that the vehicle 102 is associated with the command (e.g., the command includes the vehicle 102 VIN), and forward the command to the TCU modem 106 over the network 120. The TCU modem 106 may then process the command, which may include determining and forwarding the command to the appropriate vehicle controller 104.

The content modem 108 may be configured to facilitate large data downloads/uploads for the vehicle 102. For example, the content modem 108 may be configured to download 3D maps and software for the vehicle 102 from the backend server 130, and to upload road anomalies, video streams, and surrounding views captured by the vehicle 102 to the backend server 130, via a wireless network. Because the amount of data handled by the content modem 108 may be much larger than the amount of data handled by the TCU modem 106, the content modem 108 may be configured for higher download/upload speeds and a higher bandwidth than the TCU modem 106. The content modem 108 may also be referred to as an autonomous vehicle (AV) modem herein.

The TCU modem 106 and the content modem 108 may be configured to operate in one of three states depending on the status of the vehicle 102: an ON state (also referred to herein as a full power state), a low power state (also referred to as a Discontinuous Reception (DRx) Mode), and an off state. Responsive to the vehicle 102 entering an active state, which may occur when the vehicle 102 engine is started, a key is placed in the vehicle 102 ignition, the vehicle 102 is placed in an accessory mode, or the vehicle 102 is shifted from park and driven, both the TCU modem 106 and the content modem 108 may enter the full power state. While in the full power state, the modems 106, 108 may draw power from the vehicle 102 battery, may maintain a connection to the network 120 via their respective service providers, and may continuously wait for data to process in accordance with their respective functions.

Conversely, when the vehicle 102 enters an inactive state, which may occur when the vehicle 102 is shifted to park, the vehicle 102 engine is turned off, a key is removed from the vehicle 102 ignition, and/or the vehicle 102 is turned off, one of the modems 106, 108 may enter the low power state, and the other of modems 106, 108 may enter the off state. Specifically, the modem controller 110 (FIG. 1) may send signals to each of the modems 106, 108 to cause them to enter the aforementioned states based on the network coverage level of each modem 106, 108. While in the off state, the modems 106, 108 may not draw any power from the battery.

While in the low power state, the modems 106, 108 may periodically wake to wirelessly receive data for processing, such as from the backend server 130. Specifically, the modems 106, 108 may periodically further power themselves to check for incoming data for processing. In further embodiments, the modems 106, 108 may be able to wirelessly receive wake-up messages while in the low power state, where such wake-up messages may be in the form of an SMS message. In response to receiving a wake-up message, the modem 106, 108 may be configured to wake and receive incoming data for processing.

If the data received by the modem of the modems 106, 108 in the low power state is intended for the modem the modems 106, 108 in the off state (e.g., a remote control command may be intended for the TCU modem 106, a request for vehicle-captured video may be intended for the content modem 108), then the low power state modem of the modems 106, 108 may wake up the modem controller 110, which may then wake the other modem of the modems 106, 108 to process the data. In this way, when the vehicle 102 enters an inactive state, only one of the modems 106, 108, such as the one of the modems 106, 108 with better network coverage, may continue drawing power from the battery. Consequently, the modems 106, 108 place less strain on the vehicle 102 battery when the vehicle is in an inactive state, and the network coverage available to the vehicle 102 for receiving data for both modems 106, 108 is optimized.

Figure 3:
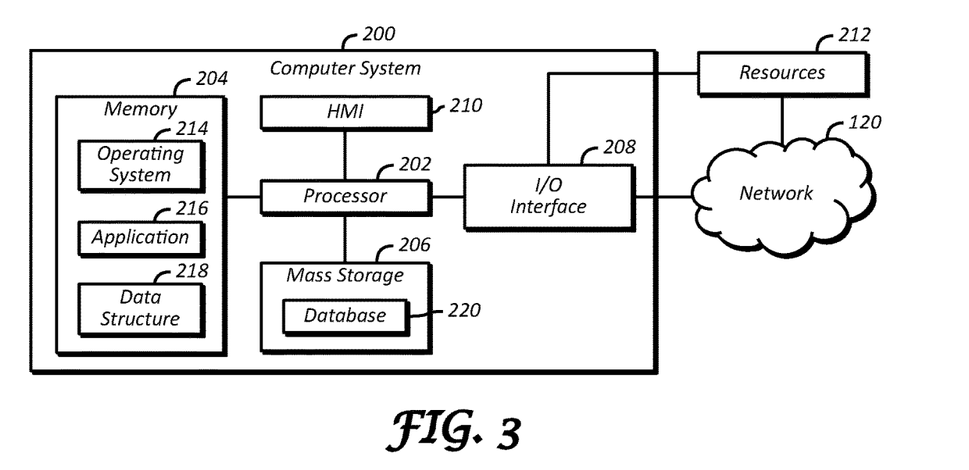
FIG. 3 is a schematic view of an exemplary computing system that may be included in the vehicle computing environment of FIG. 1.

Referring to FIG. 3, the vehicle systems of FIG. 1 may be implemented by one or more computer systems, such as exemplary computer system 200. In other words, one or more of the vehicle systems may be implemented by a same one or more computer systems, and/or one or more of the vehicle systems may each be implemented by a different one or more computer systems. The user device 126 and the backend server 30 may likewise be implemented by one or more computer systems.

The computer system 200 may include a processor 202, a memory 204, a mass storage memory device 206, an input/output (I/O) interface 208, and/or a Human Machine Interface (HMI) 210. The computer system 200 may also be operatively coupled to one or more external resources 212 via the network 120 or I/O interface 208. External resources may include, but are not limited to, servers, databases, mass storage devices, peripheral devices, cloud-based network services, or any other suitable computer resource that may be used by the computer system 200.

The processor 202 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 204. The memory 204 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 206 may include data storage devices such as a hard drive, optical drive, tape drive, non-volatile solid state device, or any other device capable of storing information.

The processor 202 may operate under the control of an operating system 214 that resides in the memory 204. The operating system 214 may manage computer resources so that computer program code embodied as one or more computer software applications, such as an application 216 residing in memory 204, may have instructions executed by the processor 202. In an alternative embodiment, the processor 202 may execute the application 213 directly, in which case the operating system 214 may be omitted. One or more data structures 218 may also reside in memory 204, and may be used by the processor 202, operating system 214, or application 216 to store or manipulate data.

The I/O interface 208 may provide a machine interface that operatively couples the processor 202 to other devices and systems, such as the network 120 or the one or more external resources 212. For example, the I/O interface 208 may connect one or more of the vehicle systems of FIG. 1 to the one or more vehicle buses 112, to the network 120, and/or to the backend server 130. The application 216 may work cooperatively with the network 120 or the external resources 212 by communicating via the I/O interface 208 to provide the various features, functions, applications, processes, or modules comprising embodiments of the invention. The application 216 may also have program code that is executed by the one or more external resources 212, or otherwise rely on functions or signals provided by other system or network components external to the computer system 200. Indeed, given the nearly endless hardware and software configurations possible, persons having ordinary skill in the art will understand that embodiments of the invention may include applications that are located externally to the computer system 200, distributed among multiple computers or other external resources 212, or provided by computing resources (hardware and software) that are provided as a service over the network 120, such as a cloud computing service.

The HMI 210 may be operatively coupled to the processor 202 of computer system 200 in a known manner to allow a user to interact directly with the computer system 200 and/or the vehicle 102. The HMI 210 may include video or alphanumeric displays, a speaker, and any other suitable audio and visual indicators capable of providing data to the user. In some cases, the HMI 210 may include a head unit display included in a center console area of the vehicle 102 cabin, and/or a screen of a gauge cluster of the vehicle 102. The HMI 210 may also include input devices and controls such as a touch screen, an alphanumeric keyboard, a pointing device, keypads, pushbuttons, control knobs, microphones, etc., capable of accepting commands or input from the user and transmitting the entered input to the processor 202. The HMI 210 may be communicably coupled to the vehicle systems of FIG. 1, such as the HMI controller 104G.

A database 220 may reside on the mass storage memory device 206, and may be used to collect and organize data used by the various systems and modules described herein. The database 220 may include data and supporting data structures that store and organize the data. In particular, the database 220 may be arranged with any database organization or structure including, but not limited to, a relational database, a hierarchical database, a network database, or combinations thereof. A database management system in the form of a computer software application executing as instructions on the processor 202 may be used to access the information or data stored in records of the database 220 in response to a query, where a query may be dynamically determined and executed by the operating system 241, other applications 216, or one or more modules.

Figure 4:
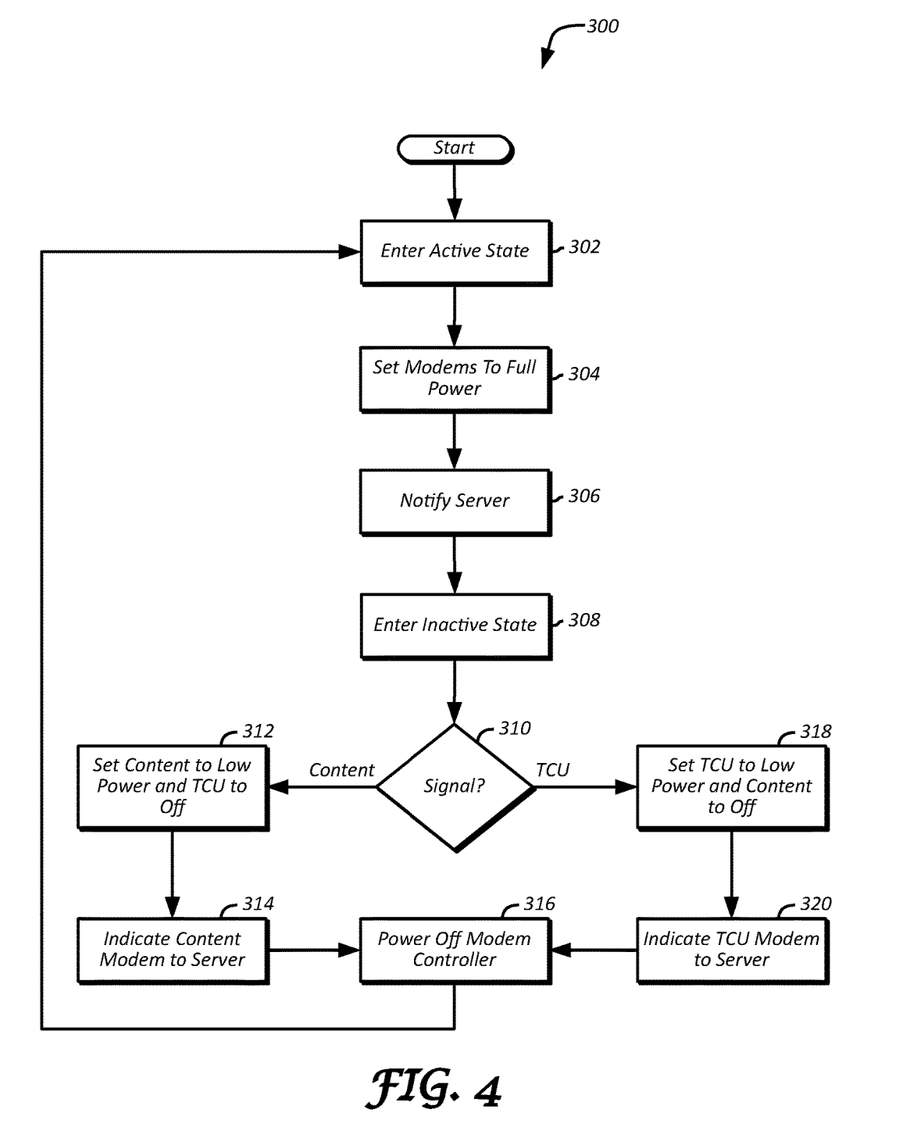
FIG. 4 is a flowchart showing an exemplary process that may be performed by the vehicle of FIG. 1.

FIG. 4 illustrates a process 300 for managing communication equipment of a vehicle 102. The process 300 may be performed by the vehicle systems illustrated in FIG. 1. To begin, the vehicle 102 may enter an active state (block 302). An active state may occur when the vehicle 102 engine is started, a key is placed in the vehicle 102 ignition, the vehicle 102 is placed in an accessory mode, the vehicle 102 is shifted from park and driven, or the vehicle 102 is powered on.

Responsive to the vehicle 102 entering the active state, each of the modems 106, 108 may enter into a full power/on state (block 304). Each of the modems 106, 108 may include computer instructions that, upon the vehicle 102 entering the active state, automatically cause each of the modems 106, 108 to place itself in the full power state. Alternatively, the modem controller 110 may transmit, responsive to the vehicle 102 entering the active state, a power control signal to each of the modems 106, 108 that causes the modems 106, 108 to enter the full power state. While in the full power state, the modems 106, 108 may continuously draw power from the vehicle 102 battery, and may receive and transmit data to perform vehicle 102 services. For example, the TCU modem 106 may be configured to receive and process data including vehicle control commands submitted via the user device 126 from the backend server 130, such as by transmitting a command signal to the vehicle controller 104 implicated by a submitted command. The content modem 108 may be configured to download 3D map data from the backend server 130, and may be configured to upload data including video and images captured by the vehicle 102 to the backend server 130.

Responsive to the modems 106, 108 entering the full power state, the vehicle 102 may notify the backend server 130 that both modems 106, 108 are active and/or able to receive wireless transmissions (block 306). In this way, the backend server 130 may direct data for the modem 106 directly to the modem 106, and may direct data for the modem 108 directly to the modem 108, without involving the other of the modems 106, 108. One or more of the modems 106, 108 may transmit the indication to the backend server 130, such as at the direction of the modem controller 110.

Thereafter, the vehicle 102 may enter an inactive state (block 308). The inactive state may occur when the vehicle 102 is shifted to park, the vehicle 102 engine is turned off, a key is removed from the vehicle 102 ignition, or the vehicle 102 is powered off. Responsive to the vehicle 102 entering the inactive state, each of the modems 106, 108 may check its network connection signal level. Specifically, each of the modems 106, 108 may be configured to communicate with the network 120 via different cellular network providers, and may have different signal strengths depending on the location of the vehicle 102. Accordingly, the modems 106, 108 may each transmit its respective network connection signal level to the modem controller 110, which may then determine which of the modems 106, 108 has better coverage based on the network connection signal level for each modem 106, 108 (block 310).

Responsive to determining that the network connection signal level for the content modem 108 is greater than the TCU modem 106 ("Content" branch of block 310), the TCU modem 106 may be placed into the off state, and the content modem 108 may be placed in the low power state (block 312). More particularly, the modem controller 110 may transmit a power control signal to each of the modems 106, 108 to cause this transition. In this way, only the one of the modems 106, 108 with relatively better network coverage, in this case the content modem 108, may draw current from the vehicle 102 battery to wirelessly receive and/or transmit data while the vehicle 102 is in the inactive state. Thereafter, the modem controller 110 may indicate the content modem 108 as the active modem to the backend server 130, such as via directing the content modem 108 to send such an indication to the backend server 130 (block 314). The modem controller 110 may then power off to help preserve the vehicle 102 battery (block 316).

Alternatively, responsive to determining that the network connection signal level for the TCU modem 106 is greater than, or equal to, or substantially equal to, the network connection signal level for the content modem 108 ("TCU" branch of block 316), the TCU modem 106 may be placed in the low power state, and the content modem 108 may be placed in the off state (block 318). In this way, when the network connection signal level for the TCU modem 106 is greater than the network connection signal level for the content modem 108, resources are not wasted on powering the content modem 108 to wirelessly receive and/or transmit data when the vehicle 102 is in the inactive state. Moreover, when the network connection signal levels are equal or substantially similar, placing the TCU modem 106 rather than the content modem 108 into the low power state may further promote efficient resource utilization. Specifically, the content modem 108 may be configured for higher download/upload speeds and larger bandwidth capabilities, which may consume more power than a modem with lower download/upload speeds and smaller bandwidth capabilities. Moreover, because the TCU modem 106 may be primarily designed to receive and process remote services while vehicle 102 is inactive, and the content modem 108 may be primarily designed for uploading and downloading data while the vehicle 102 is active, the vehicle 102 may be configured such that when the vehicle 102 is inactive and the TCU modem 106 has at least as good of a network connection signal than the content modem 108, the TCU modem 106 is placed in the low power state and the content modem 108 is placed in the off state. In alternative embodiments, a user, such as via user device 126, or a manufacturer, such as via backend server 130, may configure which modem 106, 108 is placed in the low power state and which is placed in the off state when the network connection signal levels are equal or substantially equal.

After the modems 106, 108 are set in the low power state and off state respectively, the modem controller 110 may indicate the TCU modem 106 as active to the backend server 130, such as via the TCU modem 106 (block 320), which enables the backend server 130 to know which of the modems 106, 108 to transmit data until the vehicle 102 again enters the active state. The modem controller 110 may then power off to help further preserve the vehicle 102 battery (block 316). Sometime later, the vehicle 102 may again enter the active state (block 302), at which time the modems 106, 108 may again be set to full power (block 304), and the backend server 130 may again be notified that both modems 106, 108 are active and available (block 306).

Figure 5:
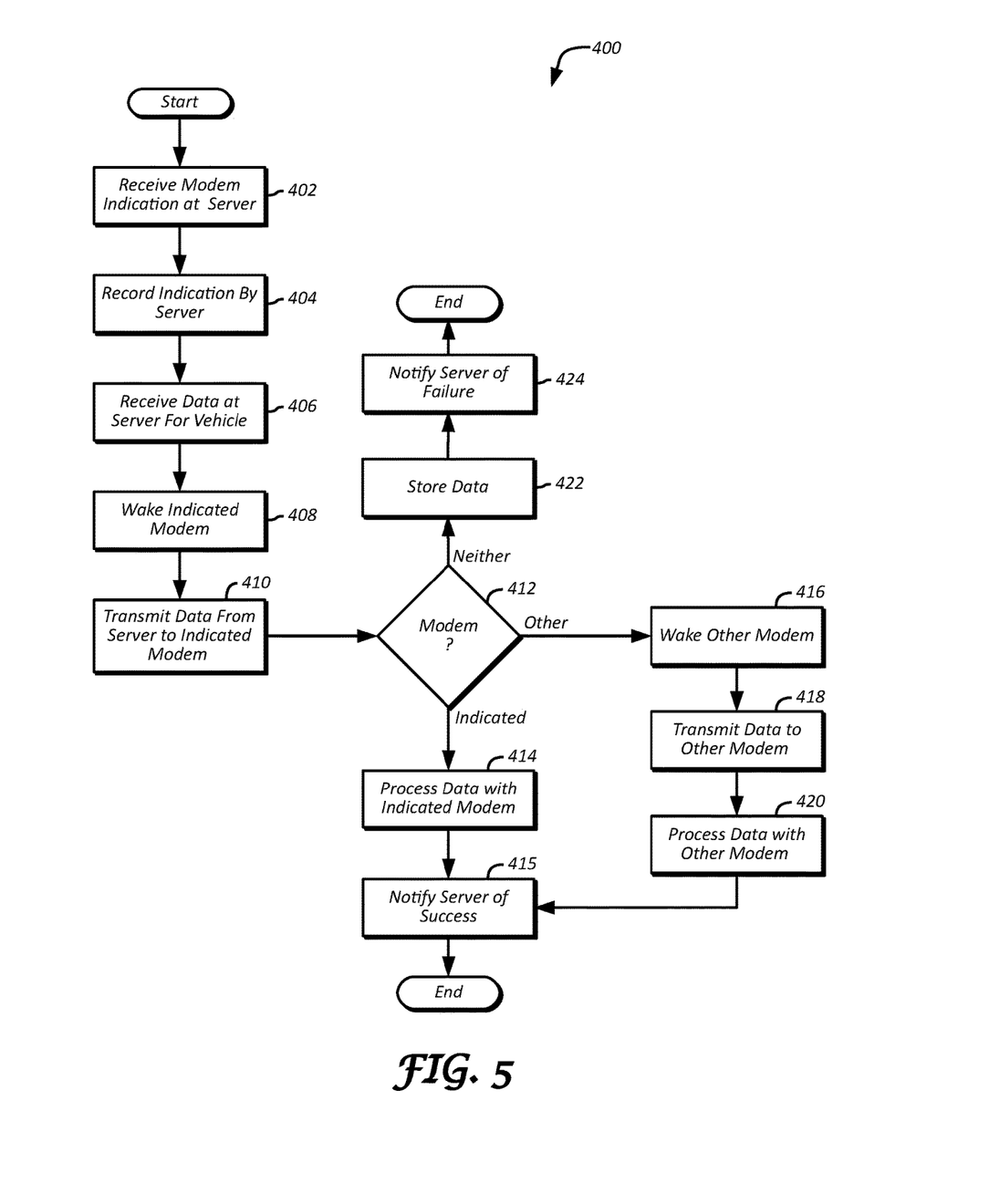
FIG. 5 is a flowchart showing an exemplary process that may be performed by the vehicle of FIG. 1 and the server of FIG. 2.

FIG. 5 illustrates a process 400 for processing data communicated between the backend server 130 and the vehicle 102. The process 400 may be performed by the vehicle systems of FIG. 1 and the systems of FIG. 2. After the vehicle 102 enters the inactive state and selects, such as via the modem controller 110, one of the modems 106, 108 to place in the low power state and the other of the modems 106, 108 to place in the off state, the backend server 130 may receive an indication of the one of the modems 106, 108 placed in the low power state from the vehicle 102 (block 402). Responsive to receiving the indication, the backend server 130 may record the indication (block 404). The backend server 130 may receive such indications from several vehicles 102. Accordingly, the backend server 130 may associate each indication with the vehicle 102 from which the indication is received, such as using the vehicle 102 VIN for the received indication.

Thereafter, while the vehicle 102 is still in the inactive state, the backend server 130 may receive data intended for either the TCU modem 106 of the vehicle 102 or the content modem 108 of the vehicle 102 (block 406). For example, data for the TCU modem 106 may include a remote control command for the vehicle 102, such as a remote unlock or remote start command, that may have been submitted via a user device 126. Data for the content modem 108 may include large files for the vehicle 102, such as a 3D map, or a request for the vehicle 102 to download a large file such as a 3D map, or a request for the vehicle 102 to capture and transmit video or one or more images of an environment around the vehicle 102. Responsive to receiving such data for the vehicle 102, the backend server 130 may wake the one of the modems 106, 108 that was indicated for the vehicle 102 as being active in the low power state (block 408). In some cases, the backend server 130 may transmit a wake-up signal to the indicated modem 106, 108, which may be in the form of an SMS message, via the cellular network to which the indicated one of the modems 106, 108 is connected. Thereafter, or with the wake-up signal, the backend server 130 may also transmit the data to the indicated one of the modems 106, 108 over the cellular network (block 410).

Responsive to receiving the data, the vehicle 102 may determine whether the data is intended for the indicated one of the modems 106, 108, namely the one of the modems 106, 108 that was left in the low power state and received the data, or for the other one of the modems 106, 108 that was placed in an off state when the vehicle last entered the inactive state (block 412). In particular, the one of the modems 106, 108 that receives the data (i.e., the indicated one of the modems 106, 108) may wake the modem controller 110, such as by transmitting a wake-up signal to the modem controller 110, and thereafter transmit the data to the modem controller 110. The modem controller 110 may then determine whether the data should be processed by the indicated one of the modems 106, 108 that received the data, or the other one of the modems 106, 108.

In some embodiments, in addition to determining which of the modems 106, 108 should process the data, the vehicle 102 may also determine whether the one of the modems 106, 108 that should be processing the data is able to process the data based on one or more conditions. For example, the received data may include a request that requires the one of the modems 106, 108 selected for processing the data to connect to its cellular network and communicate with the backend server 130 or some other device connected with the network 120 (e.g., a data upload request for a vehicle-captured image/video, or a data download request for a file, such as a 3D map). Accordingly, the modem controller 110 may be configured to determine whether the modem selected from the modems 106, 108 to process the data has adequate network coverage, such as by waking up the selected modem, requesting a network connection signal level from the selected modem, and determining whether the selected modem has a strong of signal to process the data, or more particularly to carry out a request included in the data.

Responsive to determining that the data should be processed by the other of the modems 106, 108, and possibly to determining that the other of the modems 106, 108 is able to process the data based on the one or more conditions ("Other" branch of block 412), the vehicle 102, or more particularly the modem controller 110, may wake the other one of the modems 106, 108 (if not already woken when determining whether the other one of the modems 106, 108 is able to process the data), such as by transmitting a wake-up signal thereto (block 416). Thereafter, the modem controller 110 may transmit the received data to the other one of the modems 106, 108 (block 418), which may then proceed to process the data (block 420). Alternatively, responsive to determining that the data should be processed by the indicated one of the modems 106, 108 ("Indicated" branch of block 412), then the modem controller 110 may not wake the other one of the modems 106, 108. Instead, the indicated one of the modems 106, 108, such as based on a control signal from the modem controller 110, may then proceed to process the data (block 414).

Once the data is finished being processed (e.g., a remote control command is executed), the vehicle 102 may notify the backend server 130 of the successful processing of the data (block 415). In particular, the indicated one of the modems 106, 108, or the other one of the modems 106, 108 that processed the data, may transmit such a notification to the backend server 130 over the network 120, such as at the direction of the modem controller 110.

In cases where the modem controller 110 determines that the one of the modems 106, 108 that should process the data is unable to process the data ("Neither" branch of block 412), such as because the modem lacks enough signal strength to process the data in an adequate amount of time or at all, the modem controller 110 may store the data for later processing (block 422), such as when the vehicle 102 next becomes active or the modem selected to process the data has better network coverage. Thereafter, the indicated one of the modems 106, 108 may notify the backend server 130 over the network 120 of the failure to process the data (block 424), such as at the direction of the modem controller 110.

In alternative embodiments, the receiving one of the modems 106, 108 (i.e., the indicated one of the modems 106, 108) may determine whether the data is for the indicated one of the modems 106, 108 or the other one of the modems 106, 108. Responsive to determining that the received data is for the indicated one of the modems 106, 108, the indicated one of the modems 106, 108 may not wake the modem controller 110 or the other one of the modems 106, 108, and may proceed to process the data. Responsive to determining that the received data is for the other one of the modems 106, 108, the indicated one of the modems 106, 108 may wake the modem controller 110, which may then wake and transmit the data to the other one of the modems 106, 108. Alternatively, the indicated one of the modems 106, 108 may wake and transmit the data to the other one of the modems 106, 108 directly.

Computing devices described herein, such as the vehicle controllers 104, modems 106, 108, and the modem controller 110, may generally include computer-executable instructions where the instructions may be executable by one or more computing devices such as those listed above. Computer-executable instructions, such as those of the diagnostic application 118, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a first modem; and
a second modem coupled to the first modem,
wherein the vehicle is configured to,
responsive to the vehicle entering an active state, place the first modem and the second modem into a full powerstate,
responsive to the second modem wirelessly receiving first data for the first modem when the vehicle is in an inactive state, the first modem being in an off state, and the second modem being in a low power state, wake the first modem from the off state, and process the first data via the first modem,
responsive to the vehicle entering the inactive state, identify a first network connection level for the first modem, and identify a second network connection level for the second modem, and
responsive to determining that the second network connection level is greater than the first network connection level, place the first modem into the off state, and place the second modem into the low power state.

2. The vehicle of claim 1, wherein the first network connection level relates to a first cellular provider, and the second network connection level relates to a second cellular provider.

3. The vehicle of claim 1, wherein the first data comprises a remote control command transmitted from a server, and the vehicle is further configuring to, responsive to determining that the second network connection level is greater than the first network connection level, indicate the second modem to the server.

4. The vehicle of claim 1, wherein the vehicle is an autonomous vehicle.

5. The vehicle of claim 4, wherein the first modem is a telematics control unit configured to process remote control commands received for the vehicle, and the second modem is an autonomous vehicle modem configured to download map data and upload vehicle-captured video via a wireless network.

6. The A vehicle of claim 1 comprising:
a first modem;
a second modem coupled to the first modem; and
wherein the vehicle further comprises a modem controller coupled to the first modem and the second modem, the modem controller being configured to,
responsive to the vehicle entering an inactive state, identify a first network connection level for the first modem, and identify a second network connection level for the second modem;
responsive to determining that the second network connection level is greater than the first network connection level, place the first modem into the off state, and place the second modem into the low power state; and
responsive to the second modem wirelessly receiving the first data for the first modem when the vehicle is in an inactive state, the first modem being in the off state, and the second modem being in the low power state, and responsive to receiving the first data from the second modem and determining that the first data is for the first modem, wake the first modem; and transmit the first data to the first modem for processing.

7. The vehicle of claim 6, wherein the second modem is configured to, responsive to wirelessly receiving the first data for the first modem when the vehicle is in the inactive state, the first modem being in the off state, and the second modem being in the low power state,
wake the modem controller; and
transmit the first data to the modem controller, the modem controller being configured to, responsive to receiving the first data, determine whether the first data is for the first modem or for the second modem.

8. The vehicle of claim 6, wherein the modem controller is further configured to, responsive to the second modem wirelessly receiving second data that is for the second modem and not for the first modem when the vehicle is in the inactive state, the first modem being in the off state, and the second modem being in the low power state,
determine that the second data is for the second modem and not for the first modem, and responsive to the determination, not wake the first modem.

9. A vehicle comprising:
a first modem;
a second modem coupled to the first modem,
a modem controller coupled to the first modem and the second modem, and
responsive to the second modem wirelessly receiving first data for the first modem when the vehicle is in an inactive state, the first modem being in an off state, and the second modem being in a low power state, the vehicle is configured to wake the first modem from the off state, and process the first data via the first modem, and responsive to the second modem wirelessly receiving the first data for the first modem when the vehicle is in the inactive state, the first modem being in the off state, the second modem being in the low power state, receiving the first data from the second modem and determining that the first data is for the first modem, the modem controller is configured to, wake the first modem, and transmit the first data to the first modem for processing.

10. The vehicle of claim 9, wherein the second modem is configured to, responsive to wirelessly receiving the first data for the first modem when the vehicle is in the inactive state, the first modem being in the off state, and the second modem being in the low power state, wake the modem controller, and transmit the first data to the modem controller, and wherein the modem controller is configured to, responsive to receiving the first data, determine whether the first data is for the first modem or for the second modem.

11. The vehicle of claim 9, wherein the modem controller is further configured to, responsive to the second modem wirelessly receiving second data that is for the second modem and not for the first modem when the vehicle is in the inactive state, the first modem being in the off state, and the second modem being in the low power state, determine that the second data is for the second modem and not for the first modem, and responsive to the determination, not wake the first modem.

12. The vehicle of claim 9, wherein the vehicle is further configured to, responsive to the vehicle entering the inactive state:
identify a first network connection level for the first modem;
identify a second network connection level for the second modem; and
responsive to determining that the second network connection level is greater than the first network connection level,
place the first modem into the off state, and
place the second modem into the low power state.

13. The vehicle of claim 12, wherein the first network connection level relates to a first cellular provider, and the second network connection level relates to a second cellular provider.

14. The vehicle of claim 12, wherein the first data comprises a remote control command transmitted from a server, and the vehicle is further configuring to, responsive to determining that the second network connection level is greater than the first network connection level, indicate the second modem to the server.

15. The vehicle of claim 10, wherein the vehicle is further configured to, responsive to the vehicle entering an active state, place the first modem and the second modem into a full power state.

16. The vehicle of claim 9, wherein the vehicle is an autonomous vehicle.

17. The vehicle of claim 16, wherein the first modem is a telematics control unit configured to process remote control commands received for the vehicle, and the second modem is an autonomous vehicle modem configured to download map data and upload vehicle-captured video via a wireless network.

* * * * *